US008296645B2

(12) United States Patent  
Shimizu

(10) Patent No.: US 8,296,645 B2
(45) Date of Patent: Oct. 23, 2012

(54) JUMP DESTINATION SITE DETERMINATION METHOD AND APPARATUS, RECORDING MEDIUM WITH JUMP DESTINATION SITE DETERMINATION PROGRAM RECORDED THEREON

(75) Inventor: Hirotaka Shimizu, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 1200 days.

(21) Appl. No.: 12/046,826

(22) Filed: Mar. 12, 2008

(65) Prior Publication Data

US 2008/0228898 A1    Sep. 18, 2008

(30) Foreign Application Priority Data

Mar. 15, 2007    (JP) .................................. 2007-67351

(51) Int. Cl.
*G06F 17/00*    (2006.01)
*G06F 7/00*    (2006.01)

(52) U.S. Cl. ........ 715/206; 715/205; 715/208; 707/705; 707/713; 707/716; 707/717; 707/725; 707/726

(58) Field of Classification Search .................. 715/205, 715/208; 707/705, 713, 716–717, 725–726
See application file for complete search history.

(56) References Cited

U.S. PATENT DOCUMENTS

| 6,560,717 | B1 * | 5/2003 | Scott et al. ..................... 714/4.1 |
| 7,814,043 | B2 * | 10/2010 | Uchino ................................. 1/1 |
| 2003/0101166 | A1 * | 5/2003 | Uchino et al. .................... 707/2 |
| 2003/0120649 | A1 * | 6/2003 | Uchino et al. .................... 707/5 |
| 2008/0229183 | A1 * | 9/2008 | Shimizu ........................ 715/207 |

FOREIGN PATENT DOCUMENTS

| AG | 2004-304698 | 10/2004 |
| JP | 10-207805 | 8/1998 |
| JP | 2004110698 A * | 4/2004 |

* cited by examiner

*Primary Examiner* — Chau Nguyen
(74) *Attorney, Agent, or Firm* — Staas & Halsey LLP

(57) ABSTRACT

A jump destination site determination method and system determine a site which is a jump destination of a hyperlink selected in a terminal apparatus. The system and method include receiving a jump destination distribution ratio representing a ratio of jumping to each of a plurality of sites storing same contents, which varies over time, and contents including a hyperlink to which the jump destination distribution ratio is correlated, judging whether a time period elapsing from a time the contents are received until a time the hyperlink included in the contents is selected is equal to or longer than a predetermined time period, and acquiring a jump destination distribution ratio effective at a point in time at which the hyperlink is selected from the server responsive to determining that the time period elapsed is equal to or longer than the predetermined time period.

9 Claims, 12 Drawing Sheets

FIG. 10

```
            A (following) mechanism which includes the reference
                          time in html is mounted.
#include<stdio.h>
include<time.h> main()
{ puts(
    "Content-type:text/html¥n"
    "<HTML>¥n"
    " <TITLE>hogehoge</TILTE>¥n"
    "</HEAD>¥n"
    " <BODY>¥n"
);
  .
  .
  .
  .
time_t t=time(NULL);
printf("<P>It's you arrivde time to this WEB page.<BR>)¥n"
       "%s.</P>,ctime(&t));
  .
  .
  .
  .
);
return 0;
}
```

1000

1010

JUMP DESTINATION SITE DETERMINATION METHOD AND APPARATUS, RECORDING MEDIUM WITH JUMP DESTINATION SITE DETERMINATION PROGRAM RECORDED THEREON

CROSS-REFERENCE TO RELATED APPLICATIONS

This application is related to and claims priority to Japanese patent application no. 2007-67351 filed on Mar. 15, 2007, in the Japan Patent Office, and incorporated by reference herein.

BACKGROUND

1. Field

The present invention is directed to processing of content provided on a server and, more particularly, to a method and system determining a site which is a jump destination of a selected hyperlink.

2. Description of the Related Art

In order to reduce a process load of a WEB server, there is a case in which a plurality of sites storing the same data are correlated to a hyperlink established to a WEB site made public by the WEB server, and sites which are considered jump destinations in the event that the hyperlink is designated are distributed. A site which is a jump destination is selected, for example, in accordance with a ratio set in advance (hereafter referred to as a "jump destination distribution ratio").

In order to select a site in accordance with the jump destination distribution ratio, for example, there is a method that uses an applet which operates in a terminal carrying out a WEB browsing.

For example, a setting value which regulates an operation of the applet, such as the jump destination distribution ratio, is downloaded from a specific WEB server at a point in time at which the terminal accesses a specific URL and, in the event that there is an operation of jumping to a site, a site which is the jump destination is selected in accordance with the already downloaded setting value.

However, according to the typical method described heretofore, in the event that the setting value of the applet downloaded from the WEB server has a property of changing over time, a setting value in the WEB server changes over time due to the fact that a certain time period has elapsed since the terminal has downloaded the setting value. For this reason, there is a case in which the setting value in the terminal differs from the setting value in the WEB server and, in spite of the fact that it is recommended to download a latest setting value after a temporal change into the terminal, a site is selected in accordance with the setting value downloaded at a point in time at which the terminal has first accessed the specific URL.

For this reason, there is a case in which the applet cannot carry out an optimum operation. On the other hand, in the event of adopting an operation aspect such as causing a user to download the latest setting value immediately before the user carries out an operation of jumping to a site, the user's processing load increases.

Also, an arrangement is proposed in JP-A-10-207805 such that, by enabling communication between an application on a WWW server and an applet executed on a WWW browser, and transmitting data, to which is added an identification tag indicating that they are addressed to the applet or the application, during the communication between the application and the applet, it is possible to control the applet from the application.

However, according to this method, regardless of whether or not there is a user's operation, the communication is carried out between the application and the applet. For this reason, for example, in the event that data updated every time the data is updated on the WWW server are transmitted to the WWW browser, the data is updated at a timing which a user may not intend, or a processing load increases due to communication between the application and the applet which the user does not intend.

SUMMARY

The disclosed jump destination site determination method and system determine a site which is a jump destination of a hyperlink selected in a terminal apparatus. The system and method include receiving from a server on a communication network, a jump destination distribution ratio representing a ratio of jumping to each of a plurality of sites storing same (substantially similar) contents, which varies over time, where the contents include a hyperlink to which the jump destination distribution ratio is correlated.

The disclosed jump destination determination method and system include judging whether a time period elapsing from a time contents are received until a time a hyperlink included in the contents is selected is equal to or longer than a predetermined time period, and acquiring a jump destination distribution ratio effective at a point in time at which the hyperlink is selected, from the server in response to judging the time period elapsed is equal to or longer than the predetermined time period, and determining the site in accordance with the jump destination distribution ratio acquired.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 10 is an illustration explaining contents of an applet source;

DETAILED DESCRIPTION OF THE PREFERRED EMBODIMENTS

Figure 1:
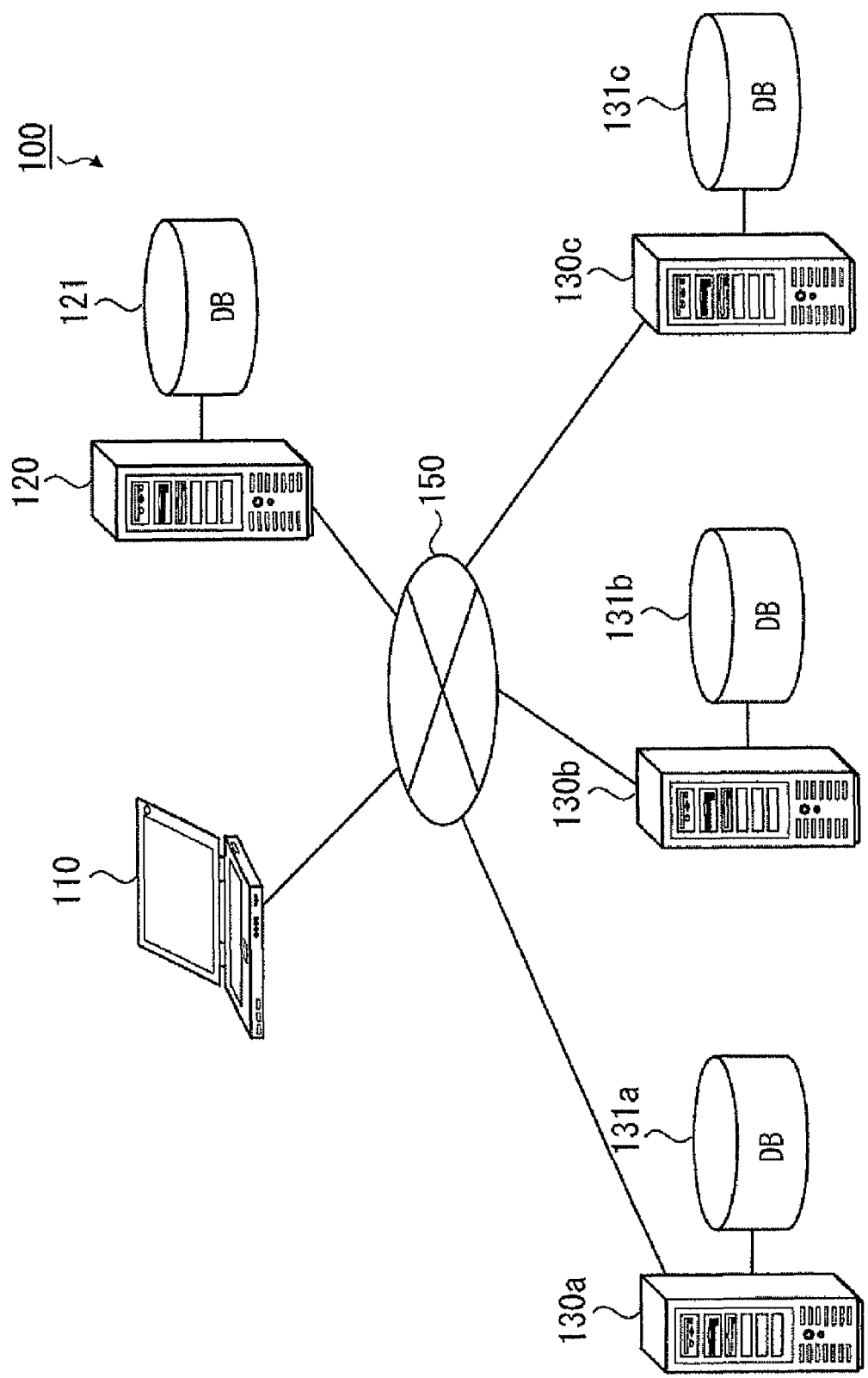
FIG. 1 is an illustration showing an outline of a jump destination site determination system.

Reference will now be made in detail to the embodiments, examples of which are illustrated in the accompanying drawings, wherein like reference numerals refer to the like elements throughout. The embodiments are described below to explain the present invention by referring to the figures.

First, a description is given, using FIG. 1, of an outline of a jump destination site determination system according to an embodiment of the invention. As shown in FIG. 1, an outline of the jump destination site determination system according to an embodiment of the invention is provided.

In FIG. 1, a jump destination site determination system 100 according to an embodiment of the invention includes a client terminal 110, a WEB server 120, and FTP (File Transfer Protocol) servers 130 (130a, 130b and 130c). In the jump destination site determination system 100, the client terminal 110, the WEB server 120 and the FTP servers 130 (130a, 130b and 130c) are computer apparatus which are connected in such a way that communication with each other can be established via a communication network 150 such as the Internet (refer to FIG. 2).

The client terminal 110 can access a WEB site, made public or available on the WEB by the WEB server 120, via the communication network 150. A user of the client terminal 110 can, by using the client terminal 110, access the WEB site made public on the WEB by the WEB server 120, and browse the WEB site.

The client terminal 110 can access each FTP server 130 (130a, 130b and 130c) via the communication network 150. The FTP servers 130 (130a, 130b and 130c) include databases (hereafter referred to as "DB's") 131 (131a, 131b and 131c), respectively.

Each DB 131 (131a, 131b and 131c) is provided with a download site (hereafter referred to as a "DL site". Refer to reference numerals 905 to 907 in FIG. 9). Each DL site can be designated using a URL (Uniform Resource Locator) correlated to each DL site. Download data (hereafter referred to as "DL data"), as contents, are placed in each DL site.

Herein, the DL data are, for example, image data, text data, various kinds of program data, etc. The client terminal 110 can download DL data placed in a DL site of a designated DB 131 (131a, 131b or 131c) via a corresponding FTP server 130 (130a, 130b or 130c).

The WEB server 120 is a computer apparatus which, including a DB 121, makes the WEB site public on the WEB, using various kinds of data stored in the DB 121. The WEB server 120 transmits data for displaying a home page (hereafter referred to as an "HP") of the WEB site to the client terminal 110 which has made an access request. Although the WEB server 120 is described herein as a computer apparatus, the present invention is not limited to using any particular type of apparatus or system as the WEB server and may include any device or a specialized system implemented to exchange data including via the communication network 150.

The WEB server 120 transmits, for example, data for displaying a hyperlink including the URL, using which a DL site having DL data is specified, to a display 208 (FIG. 2) of the client terminal 110.

Apart from data made public on the WEB site, for example, a DL site map proportion schedule DB 300 (FIG. 3) is stored in the DB 121.

In the jump destination site determination system 100, the WEB server 120 and the FTP servers 130 (130a, 130b and 130c) are not limited to being provided as separate apparatuses, instead it is also acceptable that they are provided as a single apparatus. In this case, it is also acceptable to arrange in such a way that, various kinds of DL sites stored in the DB's 131 of the FTP severs 130 are provided in the DB 121 of the WEB server 120, and the client terminal 110 accesses the DL sites via the WEB server 120. Also, it is acceptable to arrange the system 100 (FIG. 1) in such a way as to realize functions or operation(s) of the WEB server 120 and the DB 121 using the FTP servers 130 and the DB's 131.

Also, the jump destination site determination system 100 is not limited to having a single client terminal 110, instead it is also acceptable to have a plurality of client terminals. In this case, the WEB site made public on the WEB by the WEB server 120 is accessible by an unspecified number of client terminals including client terminal 110. Hereafter, in an embodiment, a description is be given supposing that there exist a plurality of the client terminals including client terminal 110 in the jump destination site determination system 100.

Also, the jump destination site determination system 100 is not limited to one WEB server, instead the system 100 may include a plurality of WEB servers. In this case, the client terminal 110 can connect with any one of the plurality of WEB servers 120, and access any one of the WEB sites made public on the WEB by the WEB servers 120.

Also, in the jump destination site determination system 100, the FTP servers 130 (130a, 130b and 130c) not being limited to three in number, it is also acceptable that the number of them is less than three, or four or more. It is also acceptable to arrange in such a way that, via the FTP servers 130 (130a, 130b and 130c), the DL sites are operated by one or a plurality of the FTP servers 130 (130a, 130b and 130c).

Figure 2:
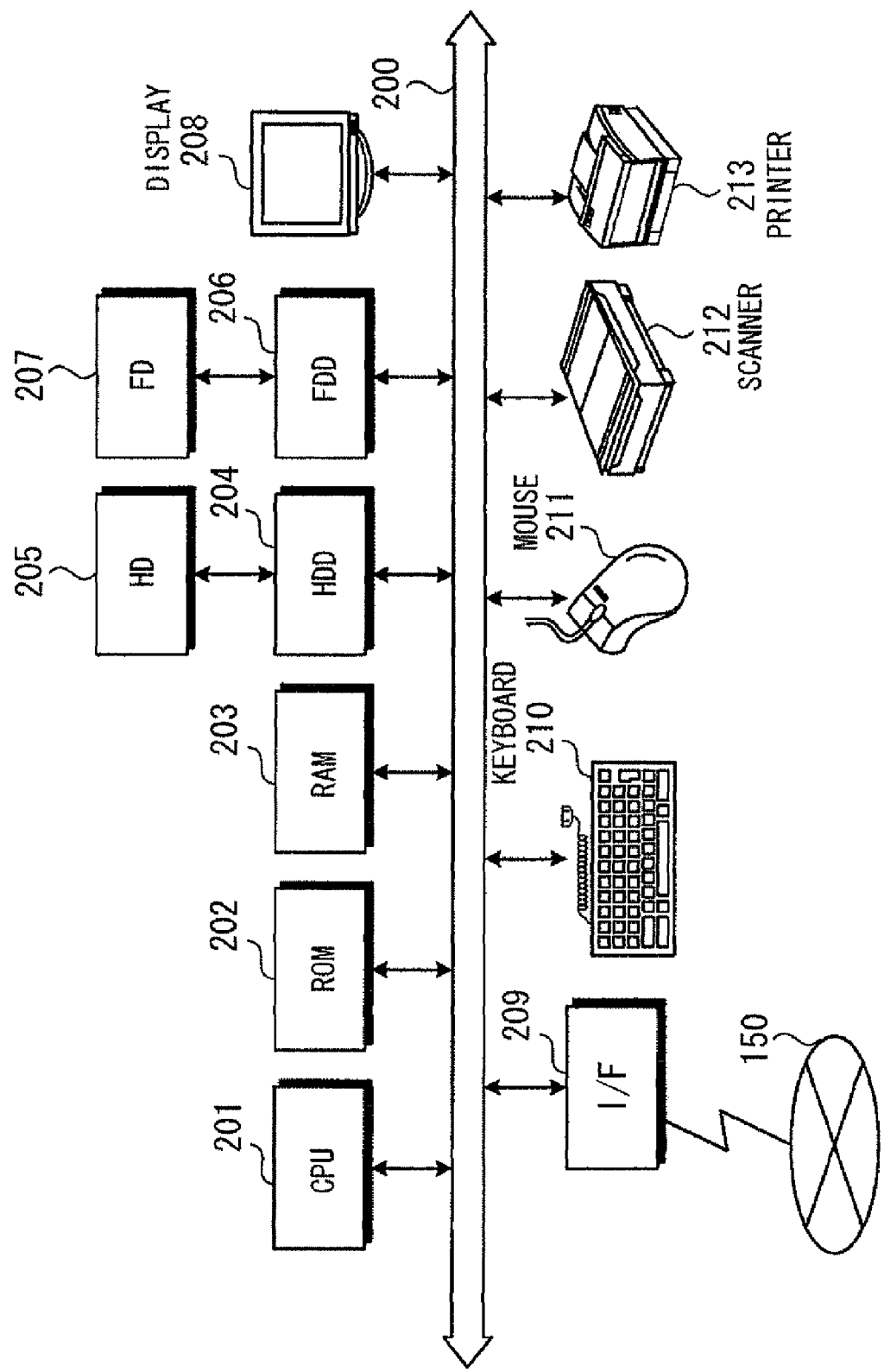
FIG. 2 is a block diagram illustrating a hardware configuration of a computer apparatus.

Next, a description is given, using FIG. 2, of a hardware configuration of the computer apparatus shown in FIG. 1. FIG. 2 is a block diagram showing the hardware configuration of the computer apparatus according to an embodiment of the invention.

In FIG. 2, each computer apparatus may include a CPU 201, an ROM 202, an RAM 203, an HDD (Hard Disk Drive) 204, an HD (Hard Disk) 205, an FDD (Flexible Disk Drive) 206, an FD (Flexible Disk) 207 as one example of a removable recording medium, the display 208, an I/F (Interface) 209, a keyboard 210, a mouse 211, a scanner 212 and a printer 213. Also, each component is connected by a bus 200.

Herein, the CPU 201 manages and controls operation(s) of the computer apparatus. The ROM 202 stores a program such as a boot program. The RAM 203 is used as a work area of the CPU 201. The HDD 204 controls reading/writing of data from/into the HD 205 in accordance with the control of the CPU 201. The HD 205 stores data written based on control of the HDD 204.

The FDD 206 controls reading/writing of data from/into the FD 207 in accordance with the control of the CPU 201. The FD 207 stores the data written based on control of the FDD 206, or has the computer apparatus retrieve the data stored in the FD 207.

Also, as the removable recording medium, apart from the FD 207, it is also acceptable to adopt a CD-ROM (CD-R, CD-RW), an MO, a DVD (Digital Versatile Disk), a memory card or the like. The display 208 displays, as well as a cursor, an icon or a tool box, data such as a document, an image, or function information. As the display 208, it is possible to adopt, for example, a CRT, a TFT liquid crystal display, or a plasma display.

The I/F 209 is connected with the communication network 150, and connected with another apparatus via the communication network 150. The I/F 209 managing an interface between the communication network 150 and an interior of the computer apparatus, controls a data input and output with an external apparatus. As the I/F 209, it is possible to adopt, for example, a modem or a LAN adapter.

The keyboard 210, including keys for inputting letters, numbers, various kinds of instruction, or the like, carries out a data input. Also, it is also acceptable to provide a touch panel type input pad, a numeric keypad, or the like, in place of, or in addition to, the keyboard 210. The mouse 211 carries out a movement of, or a range selection by, the cursor, a movement, or a resizing, of a window, or the like. It is also acceptable to adopt a trackball, a joystick or the like, instead of the mouse 211, as long as it includes a similar function as a pointing or selection device.

The scanner 212 optically reads data such as an image, and loads the image data into the computer apparatus. It is also acceptable that the scanner 212 includes an OCR function. The printer 213 prints the image data or document data. As the printer 213, it is possible to adopt, for example, a laser printer or an ink jet printer.

Figure 3:
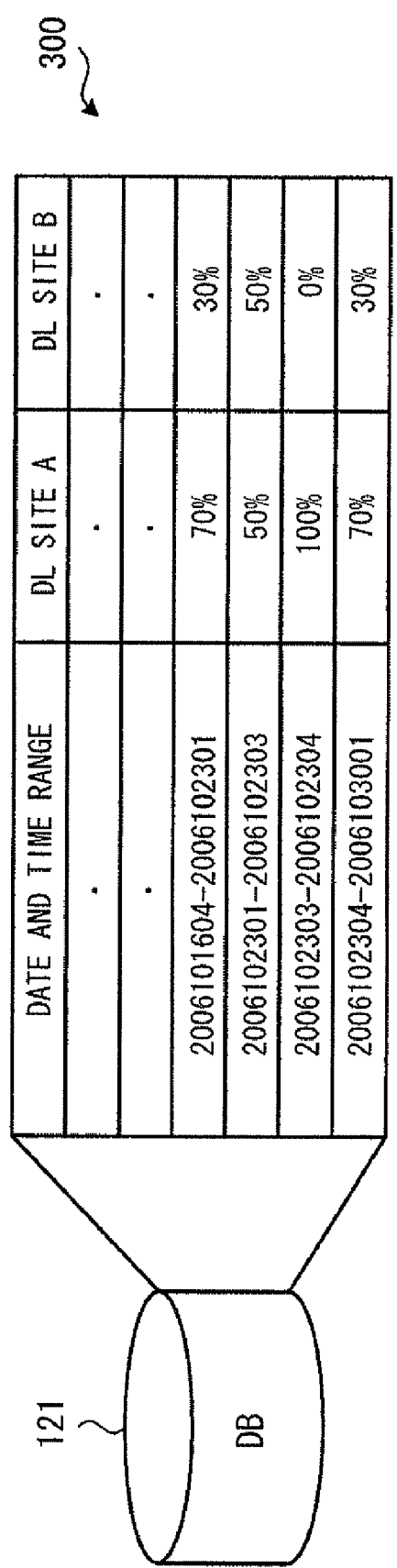
FIG. 3 is an illustration showing an outline of a DL site map proportion schedule DB.

Next, a description is given, using FIG. 3, of an outline of the DL site map proportion schedule DB in the jump destination site determination system 100 according to an embodiment of the invention. FIG. 3 is an illustration showing the outline of the DL site map proportion schedule DB according to an embodiment of the invention.

As shown in FIG. 3, a DL site map proportion schedule DB 300 is stored in the DB 121. The DL site map proportion schedule DB 300 is a database which stores, for each date and time range, a ratio (hereafter referred to as a "jump destination distribution ratio") of jumping to each of a plurality of the WEB sites which, being jump destinations of a designated hyperlink, store the same (substantially similar) contents.

FIG. 3 shows jump destination distribution ratios relating to a DL site A and a DL site B which store the same DL data or content. The jump destination distribution ratio is updated for each date and time range, in accordance with an access result in a client terminal 110 which has attempted to access the DL site A or the DL site B. That is, the jump destination distribution ratio, varying over time, exhibits a unique jump destination distribution ratio for each optional date and time range. In an embodiment, variable ratio data are realized by the jump destination distribution ratio.

In FIG. 3, the jump destination distribution ratio indicates a ratio at which a client terminal 110 which requests a download of the DL data, as a result of attempting (requesting) an access to a DL site, becomes able to access the DL site to which the client terminal 110 has attempted the access. For example, in FIG. 3, in a range from four o'clock on Oct. 16, 2006 to one o'clock on Oct. 23, 2006, the jump destination distribution ratio of the DL site A is set at 70%, and the jump destination distribution ratio of the DL site B is set at 30%. Also, in FIG. 3, in a range from one o'clock on Oct. 23, 2006 to three o'clock on Oct. 23, 2006, both the jump destination distribution ratios of the DL site A and the DL site B are set at 50%.

Figure 4:
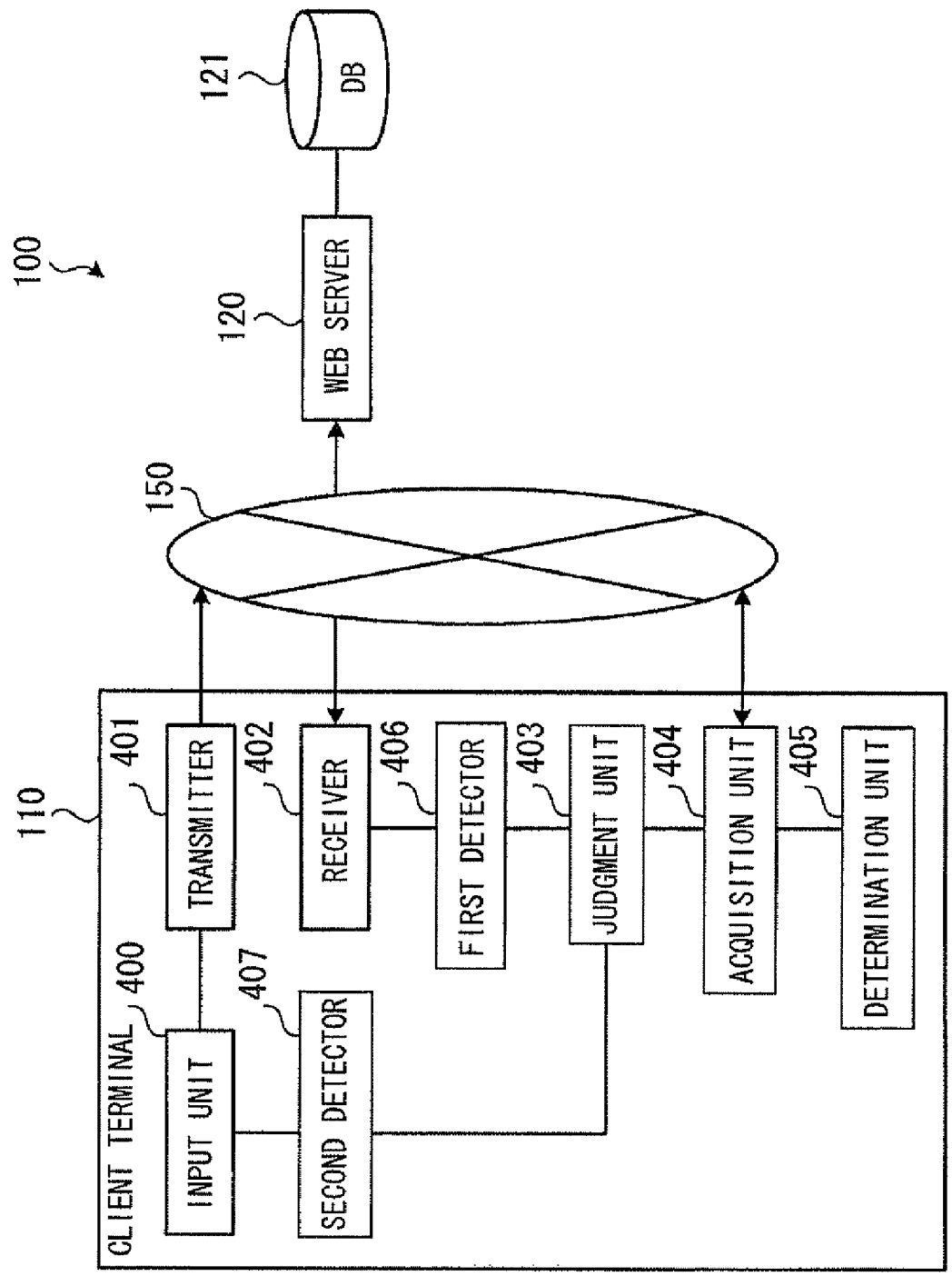
FIG. 4 is an illustration showing a functional configuration of the jump destination site determination system.

A description is given, using FIG. 4, of a functional configuration of the jump destination site determination system 100 according to an embodiment of the invention. FIG. 4 is an illustration showing the functional configuration of the jump destination site determination system 100 according to an embodiment of the invention.

As shown in FIG. 4, the WEB server 120 in the jump destination site determination system 100 according to an embodiment of the invention includes a transmitter 401, a receiver 402, a judgment unit 403, an acquirement unit 404, a determination unit 405, a first detector 406 and a second detector 407.

The transmitter 401, in the event that it receives an input of an operation by the user of the client terminal 110 relating to access to a specific site from an input unit 400, transmits a request to a WEB server 120 in which the specific site is established. Operation(s) of the input unit 400 may be implemented, for example, using the keyboard 210 or the mouse 211. Operation(s) of the transmitter 401 can be implemented, for example, using the I/F 209.

The WEB server 120, in accordance with the request transmitted from the client terminal 110, transmits a jump destination distribution ratio, and contents including a hyperlink to which is correlated the jump destination distribution ratio. Herein, the jump destination distribution ratio transmitted with the contents indicates a ratio of jumping to each of a plurality of sites which, being jump destinations of the hyperlink included in the contents, store the same (substantially similar) contents.

The receiver 402, as a result of the transmitter 401 transmitting the access request, receives the jump destination distribution ratio, and the contents including the hyperlink to which is correlated the jump destination distribution ratio, which have been transmitted from the WEB server 120 on the communication network 150. Operations(s) of the receiver 402 can be implemented, for example, using the I/F 209.

The first detector 406 detects a WEB reference time (a first time) GT at which the receiver 402 has received the contents. The first detector 406 can realize operation(s) thereof, for example, using a timer function of the CPU 201. The contents received by the receiver 402 are displayed on the display 208. When displaying the contents, the hyperlink included in the contents is displayed as, for example, using an indicator such as a predetermined letter string represented by underlined blue letters.

The user of the client terminal 110 can select a hyperlink by, for example, operating the keyboard 210 or the mouse 211. The second detector 407 can detect a current time (a second time) CT at which the hyperlink has been selected. The second detector 407 can realize operation(s) thereof, for example, using the timer function of the CPU 201.

The judgment unit 403 judges whether or not a time period elapsing from a time the contents are received by the receiver 402 until a time when the hyperlink included in the contents is selected is equal to or longer than a predetermined time period. Herein, the predetermined time period is a time period which is of a threshold value set in advance and, in an embodiment, the predetermined time period is set in advance by a manager or the like of the WEB server 120.

The judgment unit 403 can realize operation(s) thereof, for example, using the CPU 201, the ROM 202 or the RAM 203. Specifically, the judgment unit 403 judges whether or not a difference between the WEB reference time GT detected by the first detector 406 and the current time CT detected by the second detector 407 is equal to or greater than the predetermined time period (hereafter referred to as the "determined time period").

In the event that the judgment unit 403 determines that the elapsed time period is equal to or longer than the determined time period, the acquisition unit 404 acquires a latest jump destination distribution ratio from the WEB server 120. Herein, the latest jump destination distribution ratio is a jump destination distribution ratio in a date and time range including the current time CT in the DL site map proportion schedule DB 300.

In the event that the jump destination distribution ratio represents a unique jump destination distribution ratio for each optional date and time range, as described heretofore, the acquisition unit 404 acquires, as the latest jump destination distribution ratio, a jump destination distribution ratio in a date and time range including a date and time at which the hyperlink has been selected. The acquisition unit 404 can realize operations thereof, for example, using the CPU 201 or the I/F 209.

The determination unit 405, in accordance with the latest jump destination distribution ratio acquired by the acquisition unit 404, determines a DL site which is a jump destination of the hyperlink selected in the client terminal 110. The determination unit 405 can realize its operation(s) thereof, for example, the CPU 201, the ROM 202 or the RAM 203.

The determination unit 405, in accordance with the jump destination distribution ratio in the DL site map proportion schedule DB 300, determines one DL site from among a plurality of the DL sites. The determination unit 405, depending on the current time CT, determines one DL site in accordance with the jump destination distribution ratio in the date and time range including the current time CT.

Figure 5:
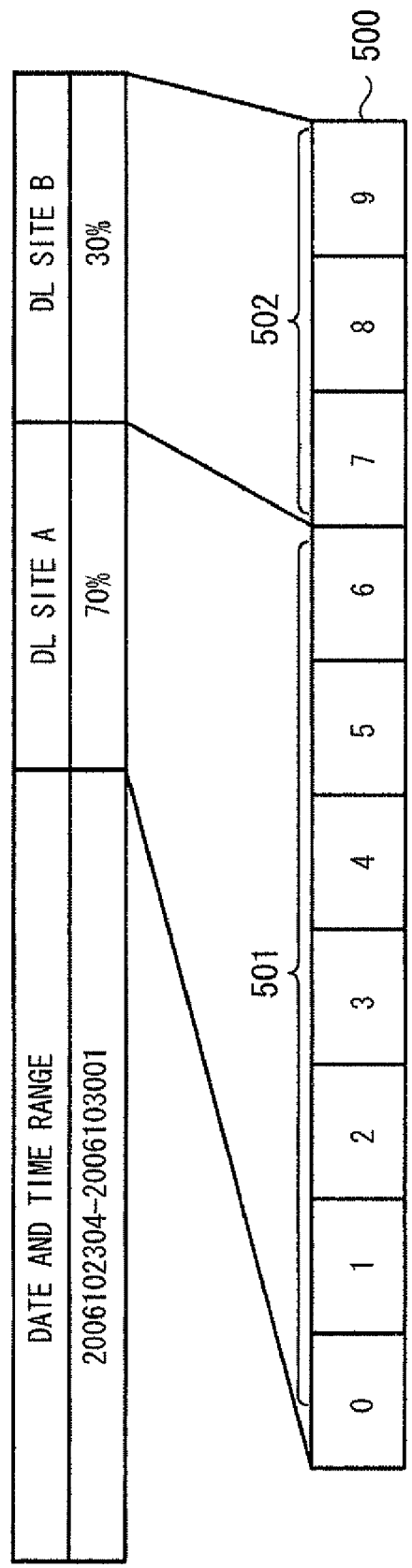
FIG. 5 is an illustration explaining a DL site determination method.

A description is given, using FIG. 5, of a DL site determination method in the jump destination site determination system 100 according to an embodiment of the invention. FIG. 5 is an illustration showing the DL site determination method according to an embodiment of the invention. In FIG. 5, a description is given, using the DL site map proportion schedule DB 300 shown in FIG. 3, of a determination method in a case of determining a DL site at a current time CT of 4:30:56, Oct. 23, 2006.

When determining a DL site, first, jump destination distribution ratios of the DL site A and the DL site B in a date and time range including the current time CT are acquired. According to the DL site map proportion schedule DB 300 shown in FIG. 3, the jump destination distribution ratio of the DL site A is set at 70%, and the jump destination distribution ratio of the DL site B is set at 30%.

Integers 500 of 0 to 9 are allotted to the DL site A and the DL site B, in accordance with the acquired jump destination distribution ratios. According to the DL site map proportion schedule DB 300 shown in FIG. 3, integers 501 of 0 to 6 are allotted to the DL site A, and integers 502 of 7 to 9 are allotted to the DL site B.

According to an embodiment, it is specified which integer, among the integers 500 of 0 to 9, corresponds to a last digit of a numeric value representing a number of seconds in the current time CT. As the current time CT is 4:30:56, Oct. 23, 2006 as described heretofore, in an embodiment, "6" is specified as the corresponding integer. Then, a DL site allotted to the specified integer is determined as a jump destination DL site.

By determining the DL site using the number of seconds of the current time CT effective at the point in time at which the DL site is determined, and the integers 500 of 0 to 9, in this way, it is possible to simply and accurately determine a DL site. Also, by determining the DL site using the number of seconds of the current time CT effective at the point in time at which the DL site is determined, and the integers 500 of 0 to 9, more than with, for example, a case in which pseudorandom numbers are generated, and a site is determined using the generated pseudorandom numbers, it is possible to prevent a disproportion of probabilities by which a specific DL site is determined, enabling a reduction in a load imposed on a process.

Also, by determining the DL site, using the number of seconds of the current time CT effective at a point in time at which the DL site is determined, and the integers 500 of 0 to 9, as the WEB server 120 does not have to analyze a number of client terminals 110 which have requested the determination of the DL site, or the like, it is possible to prevent an increase in a process load of the WEB server 120.

Although in the description, the DL site is determined using the number representing the last digit of the number of seconds of the current time CT, the DL site determination method and system is not limited to this. It being sufficient that a DL site is determined using numbers which exist with the same probability at a point in time at which the determination of the DL site has been requested, specifically, it is also acceptable to determine a site using, for example, a number indicating a first decimal place of a number of seconds of the current time CT.

By determining the DL site using a number indicating a first decimal place of a number of seconds of a current time CT, even in the event that accesses from a plurality of the client terminals 110 concentrate in a very short time period (for example, several seconds), it is possible to determine a DL site for each client terminal 110.

Figure 6:
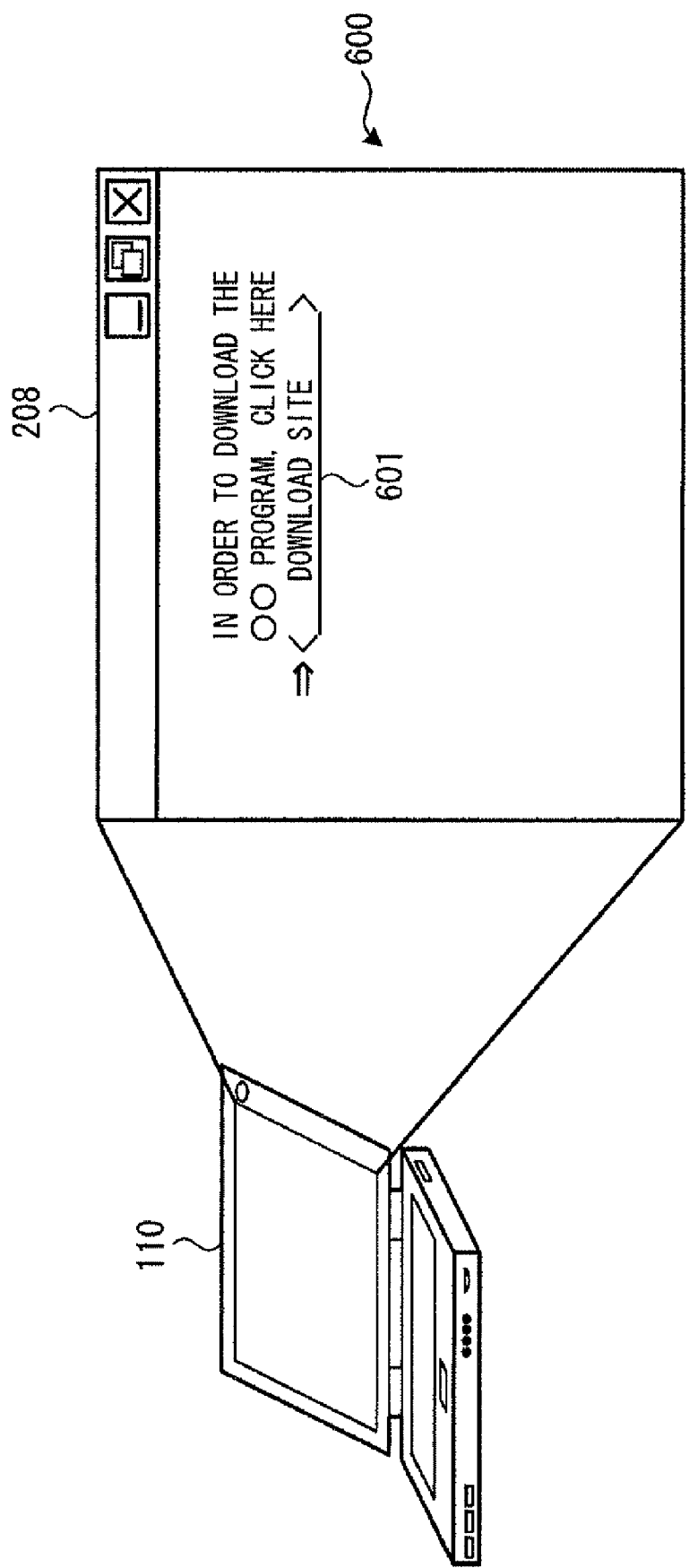
FIG. 6 is an illustration showing one example of a display screen of a client terminal.

A description is given, using FIG. 6, of a display screen of the client terminal 110 in the jump destination site determination system 100 according to an embodiment of the invention. FIG. 6 is an illustration showing one example of the display screen of the client terminal 110 according to an embodiment of the invention.

In FIG. 6, a display screen 600 is displayed on the display 208 of the client terminal 110. A hyperlink 601 shown by a string "<download site>" is displayed on the display screen 600 shown in FIG. 6. An underline, displayed under the string, indicates that the string "<download site>" is the hyperlink 601. Information of the hyperlink 601 is not limited to any particular content and may include various types of data and/or code(s) directing access to a site.

The hyperlink 601 is data described by an html format including an applet, which determines a DL site (for example, refer to the DL site A or the DL site B) storing DL data for downloading a "oo program" into the determination unit 405, and an applet which, a jump being made to one DL site determined by executing the applet, downloads DL data from the one DL site to which the jump has been made.

The applets included in the hyperlink 601 displayed on the display screen 600 can be executed in the event that the hyperlink 601 is selected by the user of the client terminal 110 operating the keyboard 210 or mouse 211 shown in FIG. 2.

Figure 7:
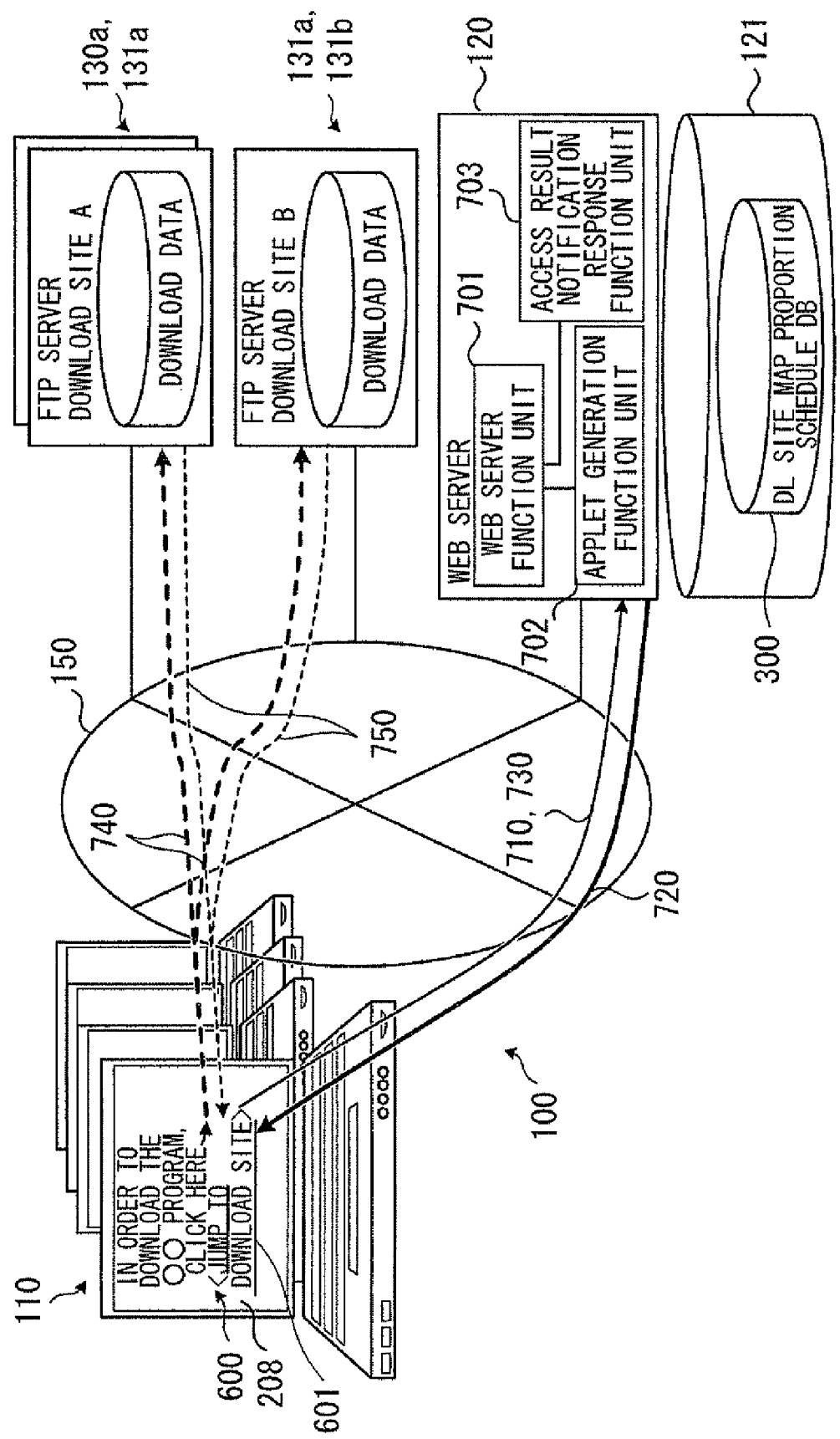
FIG. 7 is an illustration showing a principle configuration of a jump destination site determination process of a jump destination site determination system.

A description is given of a principle configuration of a jump destination site determination process in the jump destination site determination system 100. FIG. 7 is an illustration showing the principle configuration of the jump destination site determination process in the jump destination site determination system 100 according to an embodiment of the invention. In FIG. 7, reference numerals 710, 720, 730, 740 and 750 show a data transmission direction and order in the jump destination site determination system 100.

The client terminal 110, in the event that it has received a predetermined operation related to a request for browsing or accessing a specific site, sends a request for data for displaying the specific site on the display 208 of the client terminal 110 to the WEB server 120 (refer to reference numeral 710 in FIG. 7).

The WEB server 120, in the event that it has received the request sent from the client terminal 110, transmits a response to the client terminal 110 (refer to reference numeral 720 in FIG. 7). The response includes contents representing the display screen 600 including the hyperlink 601, an applet for displaying the contents, and data indicating jump destination distribution ratios of a plurality of DL sites which are jump destinations of the hyperlink 601.

The transmission of the response is realized by a WEB server function unit 701 included in the WEB server 120. Although description of a response transmission function realized by the WEB server function unit 701 is omitted because it can be realized using operation(s) an existing WEB server, when realizing the response transmission function, an applet is generated by an applet generation function unit 702 included in the WEB server 120.

The applet generation function unit 702 realizes a function of editing an applet described in accordance with an http data format, and compiling the edited applet. The WEB server function unit 701 transmits the applet compiled by the applet generation function unit 702, and data relating to a jump destination distribution ratio in a data and time range including a time at which the request transmitted from the client terminal 110 has been received, to the client terminal 110.

The client terminal 110, in the event that it has received the response transmitted from the WEB server 120, as well as displaying the display screen 600 on the display 208, detects the WEB reference time GT at which the response has been received, and stores data relating to the detected WEB reference time GT in the RAM 203 or the like. Also, the client terminal 110 stores the data relating to the jump destination distribution ratio, received with the response, in the RAM 203 or the like.

Then, the client terminal 110 waits until the hyperlink 601 displayed on the display screen 600 is selected and, in the event that it has been selected, detects the current time CT at which the hyperlink 601 has been selected, and stores the data indicating the detected current time CT in the RAM 203 or the like. Subsequently, the client terminal 110 calculates a difference between the current time CT, at which the hyperlink 601 has been selected, and the WEB reference time GT, at which the response has been received, as an elapsed time period, and judges whether or not the calculated elapsed time period is within the determined time period set in advance.

In the event that the calculated elapsed time period is equal to or longer than the determined time period set in advance, the client terminal 110 sends a latest DL site request, which requests data relating to the latest jump destination distribution ratio, to the WEB server 120 (refer to reference numeral 730 in FIG. 7). Herein, the latest DL site request is data which request the WEB server 120 to transmit the data indicating the latest jump destination distribution ratio in the DL site map proportion schedule DB 300 from the WEB server 120 to the client terminal 110.

The WEB server 120, in the event that it has received the latest DL site request sent from the client terminal 110, transmits a latest DL site notification to the client terminal 110 (refer to reference numeral 720 in FIG. 7). The latest DL site notification includes the data relating to the latest jump destination distribution ratio in the DL site map proportion schedule DB 300 stored in the DB 121 of the WEB server 120. The transmission of the latest DL site notification may also realized by the WEB server function unit 701 included in the WEB server 120.

The client terminal 110, in accordance with the latest jump destination distribution ratio included in the latest DL site notification, determines a DL site which is a jump destination.

Then, by executing the applet included in the response, the client terminal 110 accesses one DL site (herein, the DL site A) determined in accordance with the latest jump destination distribution ratio (refer to reference numeral 740 in FIG. 7), and carries out a download of DL data in the one DL site A (refer to reference numeral 750 in FIG. 7).

On the other hand, in the event that the calculated elapsed time period is within the determined time period set in advance, the client terminal 110 determines a DL site, which is a jump destination, in accordance with the jump destination distribution ratio transmitted with the response at the WEB reference time GT. Then, the client terminal 110 accesses the one DL site (herein, the DL site A) determined by executing the applet included in the response (refer to reference numeral 740 in FIG. 7), and carries out the download of the DL data in the one DL site A (refer to reference numeral 750 in FIG. 7).

Figure 8:
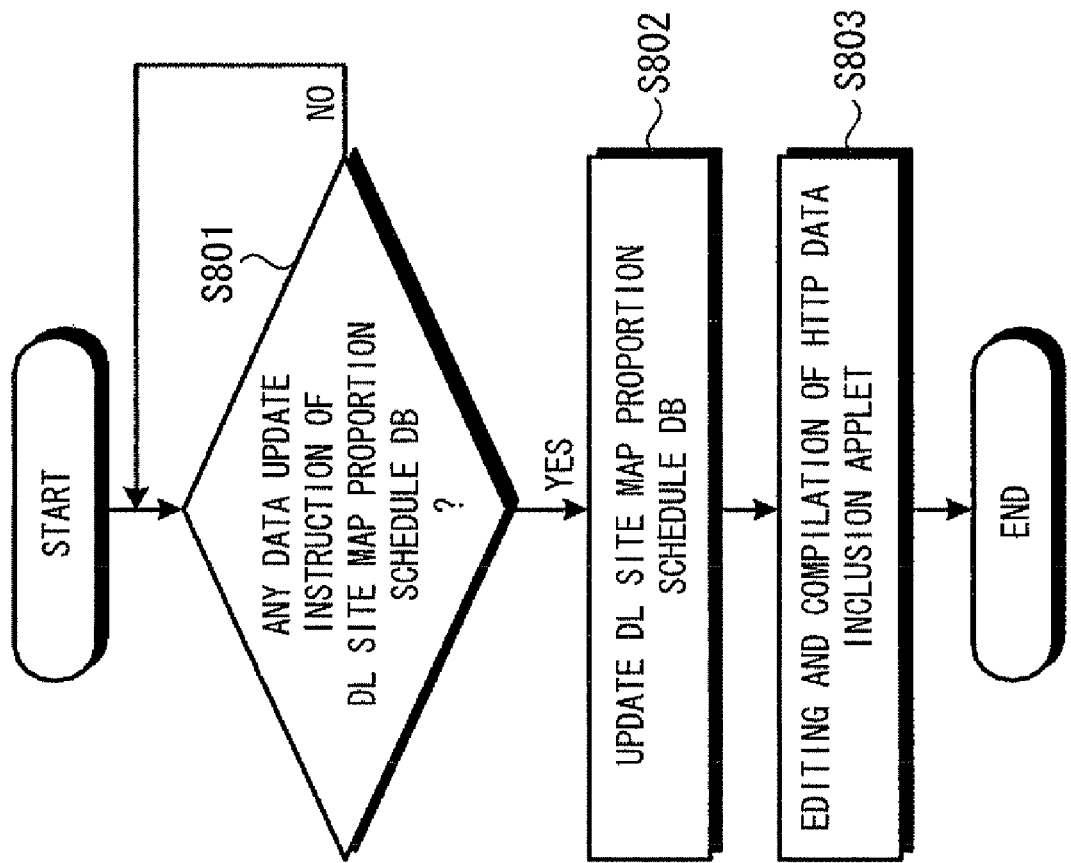
FIG. 8 is a flowchart illustrating a processing procedure of a WEB server.

A description is given of a processing procedure of the WEB server 120. FIG. 8 is a flowchart showing a processing procedure of the WEB server 120. In FIG. 8, the procedure waits until there is a DL site map proportion schedule DB 300 data update instruction (operation S801: No). The DL site map proportion schedule DB 300 data update instruction is issued for example, in the event that it is judged, by an access result notification response function unit 703, that an access failure notification transmitted from the client terminal 110 is of a predetermined threshold value or greater.

If there is a data update instruction in operation S801, (operation S801: Yes), the DL site map proportion schedule DB 300 is updated by the access result notification response function unit 703 (operation S802), an editing and compilation of the http data inclusion applet are carried out by the applet generation function unit 702, based on the updated DL site map proportion schedule DB 300 (operation S803), and the series of processes is finished.

According to the processing procedure of the WEB server 120 illustrated in FIG. 8, the editing and compilation of the applet are carried out every time the DL site map proportion schedule DB 300 is updated. By storing the edited and compiled applet in a predetermined memory, it is possible to, as well as swiftly provide an applet requested by a client, reduce a processing load when providing the applet.

Figure 9:
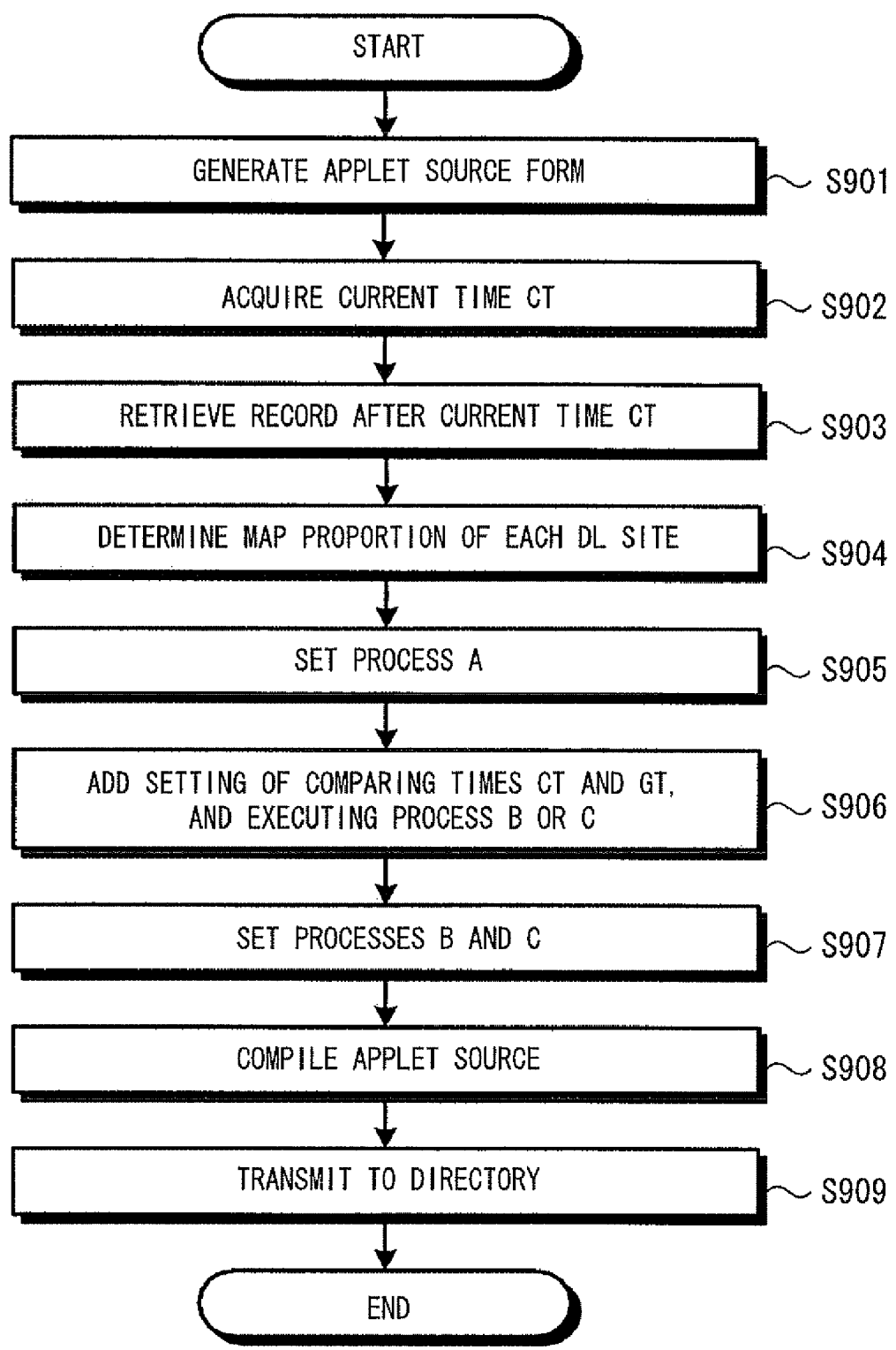
FIG. 9 is a flowchart illustrating a processing procedure of a WEB server.

A description is given of a processing procedure of the WEB server 120. FIG. 9 is a flowchart showing a processing procedure of the WEB server 120. The processing procedure shown in FIG. 9 is a process carried out in operation S803 in the processing procedure shown in FIG. 8.

In FIG. 9, an applet source form is generated (operation S901), and a time (hereafter referred to as the "current time CT") at which the editing and compilation of the applet are carried out is acquired (operation S902). Then, a record after a date and time range including the current time CT in the DL site map proportion schedule DB 300 is retrieved (operation S903), and a map proportion of each of the DL sites A and B is determined (operation S904). In operation S904, jump destination distribution ratios of the DL sites A and B according to the record retrieved in operation S903 are determined as the map proportions of the DL sites A and B.

Subsequently, a process A, an additional setting process, a process B, a process C and a jump process are sequentially set in the applet source (operations S905 to S907) and, after the applet source with each process set therein is compiled (operation S908), the compiled applet source is transmitted to a directory (operation S909), and the series of processes is finished. Herein, the directory is a place in which data for the WEB server 120 to be provided to the client terminal 110, such as the compiled applet source, are temporarily stored.

The process A in the processing procedure of FIG. 9 is a process which, by being executed in the client terminal 110, in the event that "jump to download site" described as a letter string in http data has been selected as the applet source form in the client terminal 110, acquires a current time CT at which it has been selected, determines a last digit of a number indicating a number of seconds of the acquired current time, and sets it as a value TS.

The process B in the processing procedure (FIG. 9) is a process which, the client terminal 110 transmitting the latest DL site request to the WEB server 120, in the event that it has received the latest DL site notification as a result of transmitting the latest DL site request, causes the client terminal 110 to jump to a corresponding DL site.

The process C in the processing procedure shown in FIG. 9 is a process setting a process D which sets a process on a branch condition that the process is carried out for "each date and time range TZ including current time CT". Then, the process D in the processing procedure (FIG. 9) is a process which causes the client terminal 110 to carry out an allotment of the integers of 0 to 9 in accordance with the map proportion of the DL site A and the DL site B in the date and time range TZ including the current time CT (refer to the description of FIG. 5) and, in the event that an allotted number matches a value TS, to jump to a corresponding DL site (the DL site A or the DL site B).

A description is given of contents of an applet source. FIG. 10 is an illustration explaining contents of an applet source. As shown in FIG. 10, an applet source 1000 includes a description 1010 including a reference time. For example, according to the description 1010, a current time CT at which a WEB site (a WEB page) has been accessed can be included in the html.

Figure 11:
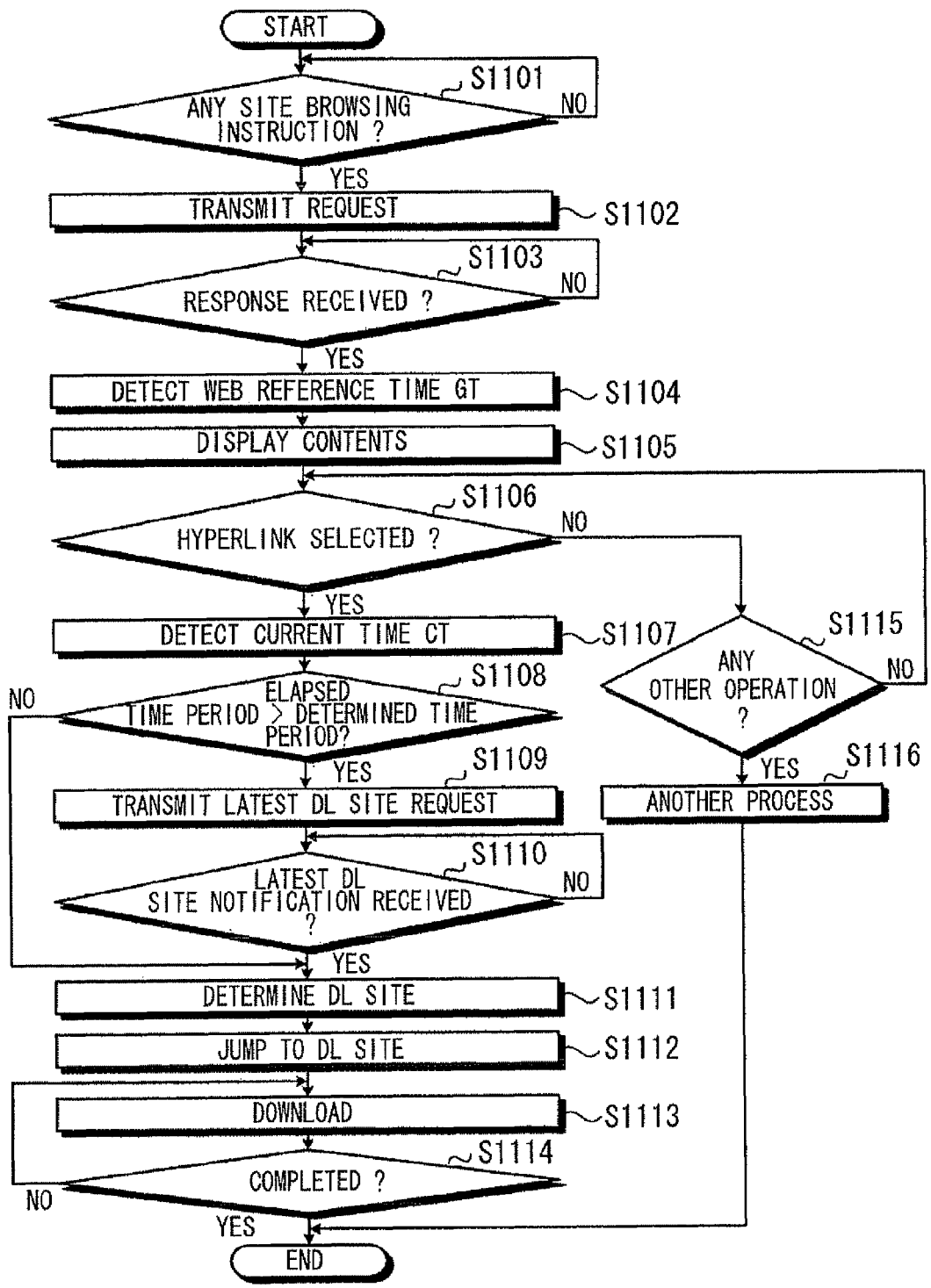
FIG. 11 is a flowchart illustrating a processing procedure of a client terminal.

A description is given of a processing procedure of the client terminal 110. FIG. 11 is a flowchart showing a processing procedure of the client terminal 110. In FIG. 11, the procedure waits until there is a site browsing instruction to browse a specific site via an operation of the keyboard 210 or the mouse 211 (operation S1101: No) and, if there is a site browsing instruction (operation S1101: Yes), a request asking for contents for displaying the specific site requested for browsing on the display 208 is transmitted to the WEB server 120 (operation S1102).

Continuing, the procedure waits until a response to the request transmitted in operation S1102 is received (operation S1103: No) and, if the response has been received (operation S1103: Yes), as well as a time at which the response has been received (hereafter referred to as a "WEB reference time GT") being detected (operation S1104), contents included in the received response are displayed on the display 208 (operation S1105). By this technique, for example, the display screen 600 shown in FIG. 6 is displayed on the display 208 of the client terminal 110.

The user of the client terminal 110 browses the display screen 600 or the like displayed on the display 208, and uses the keyboard 210, the mouse 211 or the like, when needed, to select the hyperlink 601 displayed on the display screen 600. The client terminal 110, during the display of the display screen 600, judges whether or not the hyperlink 601 has been selected (operation S1106).

If the hyperlink 601 has been selected in operation S1106 (operation S1106: Yes), a time at which the hyperlink 601 has been selected (hereafter referred to as a "current time CT") is detected (operation S1107). Then, it is judged whether or not a time period elapsing from the WEB reference time GT detected in operation S1104 to the current time CT detected in operation S1107 is longer than the determined time period (operation S1108). Data relating to the determined time period, used for the judgment in operation S1108, are included in, for example, the response received in operation S1103.

If, in operation S1108, the elapsed time period is longer than the determined time period (operation S1108: Yes), the latest DL site request is transmitted to the WEB server 120 (operation S1109). The WEB server 120 which has received the latest DL site request transmits the latest DL site notification including the data indicating the latest jump destination distribution ratio in the DL site map proportion schedule DB 300, stored in the DB 121, to the client terminal 110 which is a transmission source of the latest DL site request.

In operation S1110, the procedure waits until the latest DL site notification corresponding to the latest DL site request transmitted in operation S1109 is received (operation S1110: No) and, if it has been received (operation S1110: Yes), a DL site which is a jump destination is determined based on the received latest DL site notification (operation S1111).

Then, as well as a jump being made to the DL site determined in operation S1111 (operation S1112), DL data are downloaded from the DL site to which the jump has been made (operation S1113). Subsequently, the procedure waits until the download is completed (operation S1114: No). If the download is not completed in operation S1114 (operation S1114: No), the procedure returns to operation S1113, and the download continues to be carried out, while if the download is completed (operation S1114: Yes), the series of processes is finished.

Contrarily, if the hyperlink 601 is not operated or selected in operation S1106 (operation S1106: No), it is judged whether or not there is another operation (operation S1115). If there is no other operation (operation S1115: No), the procedure returns to operation S1106. Contrarily, if there is another operation (operation S1115: Yes), another process corresponding to operation contents is carried out (operation S1116), and the series of processes is finished.

Figure 12:
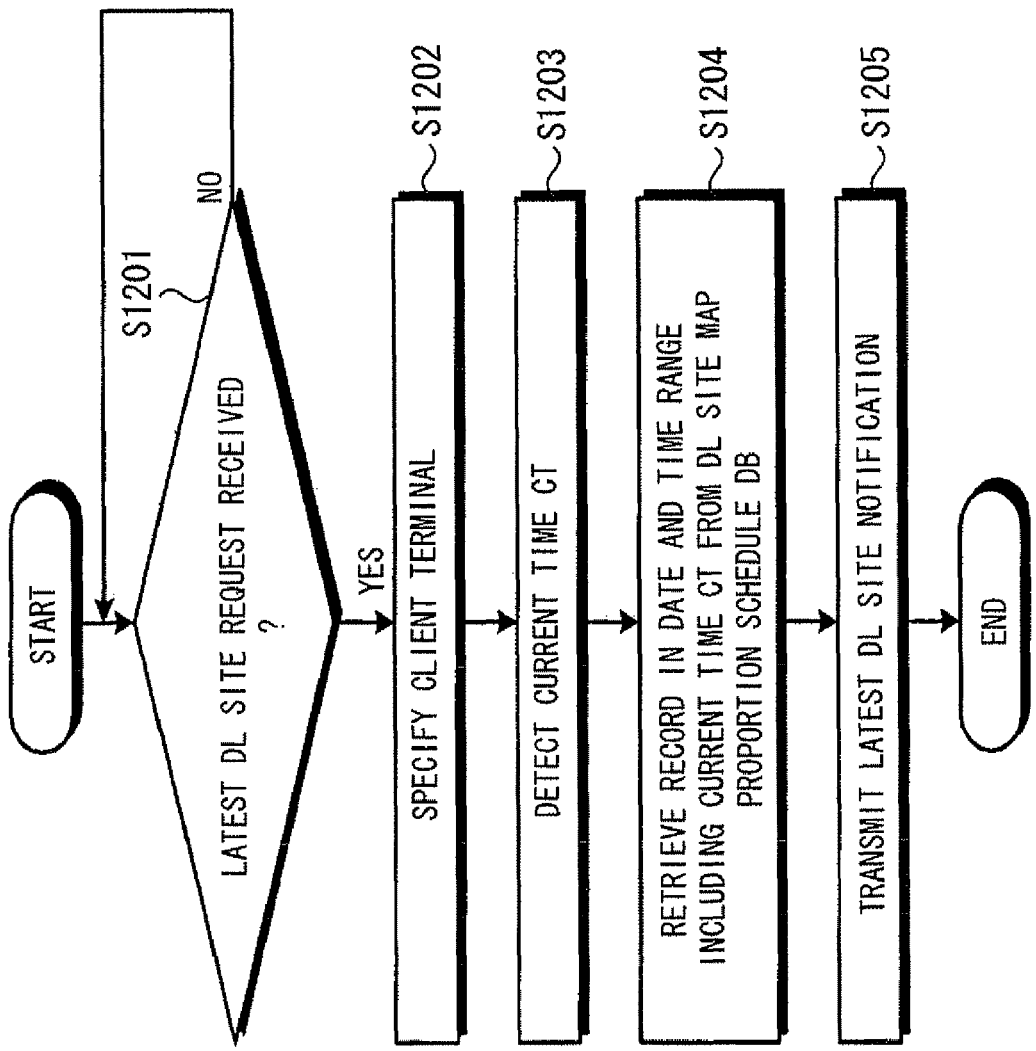
FIG. 12 is a flowchart illustrating a processing procedure of a WEB server.

A description is given of a processing procedure of the WEB server 120. FIG. 12 is a flowchart showing a processing procedure of the WEB server 120. In FIG. 12, the procedure waits until the latest DL site request transmitted from the client terminal 110 is received (operation S1201: No) and, if it has been received (operation S1201: Yes), as well as a client terminal 110 which is a transmission source of the received latest DL site request being specified (operation S1202), a current time CT at which the latest DL site request has been received is detected (operation S1203).

Continuing, in accordance with the current time CT detected in operation S1203, a record of a date and a time range including the current time CT is retrieved from the DL site map proportion schedule DB 300 (operation S1204). The record retrieved in operation S1204 is the latest jump destination distribution ratio in the DL site map proportion schedule DB 300.

Subsequently, the latest DL site notification including the data indicating the latest jump destination distribution ratio, which is the record retrieved in operation S1204, is transmitted to the client terminal 110 which is the transmission source of the latest DL site request received in operation S1201 (operation S1205), and the series of processes is finished.

As described herein, according to an embodiment, even in the event that the DL site map proportion schedule DB 300 is updated, and a DL site most appropriate as a jump destination is changed, in a period starting from contents including the hyperlink 601 are received until a time the hyperlink 601 included in the contents is selected, it is possible to determine an optimum site as the jump destination at the point in time at which the hyperlink 601 is selected.

Accordingly, it is possible to cause the client terminal 110 to jump to an optimum DL site without imposing any load on the user of the client terminal 110, and provide the user of the client terminal 110 with a convenient access environment.

Also, according to an embodiment, even in the event that the DL site most appropriate as the jump destination has been changed, as it is possible to receive the latest DL site notification only in the event that the latest jump destination distribution ratio is needed, it is possible to suppress a volume of data acquired from the WEB server 120 and, while suppressing an increase in a processing load when acquiring the latest jump destination distribution ratio, determine the optimum site as the jump destination at the point in time at which the hyperlink has been selected.

Accordingly, it is possible to cause the client terminal 110 to jump to an optimum site without imposing any load on the user of the client terminal 110 by a processing time period being lengthened due to the increase in the processing load, and provide the user of the client terminal 110 with the convenient access environment.

Also, according to an embodiment, by it being judged, based on the WEB reference time GT and the current time CT whether or not the elapsed time period is equal to or longer than the determined time period, it is possible to, while suppressing an increase in a processing load imposed on the judgment, determine an optimum site as the jump destination at the point in time at which the hyperlink 601 has been selected.

According to the disclosed system and method, it is possible to cause a client terminal to jump to an optimum site without imposing any load on a user of the client terminal by a processing time period being lengthened due to an increase in the processing load, and provide the user of the client terminal with the convenient access environment.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A jump destination site determination method which determines a site which is a jump destination of a hyperlink selected in a terminal apparatus, comprising:
   receiving, from a server, a jump destination distribution ratio representing a ratio of jumping to each of a plurality of sites storing same contents, and varies over a time, said contents including a hyperlink to which the jump destination distribution ratio is correlated;
   judging whether a time period elapsing from a time the contents are received until a time the hyperlink included in the contents is selected is equal to or longer than a predetermined time period;
   calculating a jump destination distribution ratio effective at a point in time when the hyperlink is selected from the server and said judging indicates that the time period elapsed is equal to or longer than the predetermined time period; and
   determining the site in accordance with the jump destination distribution ratio calculated.

2. The jump destination site determination method according to claim 1, wherein variable ratio data represents the ratio of jumping in relation to each of the plurality of sites in units of an optional date and a time range, and
   said acquiring includes acquiring variable ratio data representing a ratio of date and time ranges including a date and a time at which the hyperlink is selected.

3. The jump destination site determination method according to claim 1, comprising:
   detecting a first time, at which the contents have been received by said receiving; and
   detecting a second time, at which the hyperlink is selected, and
   wherein said judging includes determining whether a difference between the first time and the second time is equal to or greater than the predetermined time period.

4. A non-transitory computer readable recording medium on which is recorded a program causing a computer to execute operations including determining a site which is a jump destination of a hyperlink selected in a terminal apparatus, comprising:
   receiving, from a server, a jump destination distribution ratio representing a ratio of jumping to each of a plurality of sites storing same contents, and varies over time, said contents including a hyperlink to which the jump destination distribution ratio is correlated;
   judging whether a time period elapsing from a time the contents are received until a time the hyperlink included in the contents is selected is equal to or longer than a predetermined time period;
   calculating a jump destination distribution ratio effective at a point in time when the hyperlink is selected, from the server, and said judging indicates that the time period elapsed is equal to or longer than the predetermined time period; and
   determining the site in accordance with the jump destination distribution ratio calculated.

5. The non-transitory computer readable recording medium, on which the program is recorded, according to claim 4, wherein variable ratio data represents the ratio of jumping to each of the plurality of sites in units of an optional date and a time range, and
   said acquiring includes acquiring variable ratio data representing a ratio of date and time ranges including a date and a time at which the hyperlink is selected.

6. The non-transitory computer readable according to claim 4, comprising:
   detecting a first time, at which the contents have been received by said receiving; and
   detecting a second time, at which the hyperlink is selected, and
   wherein said judging includes determining whether a difference between the first time and the second time is equal to or greater than the predetermined time period.

7. A jump destination site determination apparatus which determines a site which is a jump destination of a hyperlink selected in a terminal apparatus, comprising:
   a processor configured to communicate with the jump destination site determination apparatus that includes:
      a reception unit which receives, from a server, a jump destination distribution ratio representing a ratio of jumping to each of a plurality of sites storing same contents, and varies over time, said contents including a hyperlink to which the jump destination distribution ratio is correlated;
      a judgment unit which judges whether a time period elapsing from a time the contents are received by the reception unit until a time the hyperlink included in the contents is selected is equal to or longer than a predetermined time period;

an acquisition unit which, acquires a calculated jump destination distribution ratio effective at a point in time when the hyperlink is selected from the server and said judgment unit determines that the time period elapsed is equal to or longer than the predetermined time period; and a determination unit which determines the site in accordance with the calculated jump destination distribution ratio by the acquisition unit.

8. The jump destination site determination apparatus according to claim 7, wherein variable ratio data represents the ratio of jumping in relation to each of the plurality of sites in units of an optional date and a time range, and said acquiring includes acquiring variable ratio data representing a ratio of date and time ranges including a date and time at which the hyperlink is selected.

9. The jump destination site determination apparatus according to claim 7, comprising:
detecting a first time, at which the contents have been received by said receiving; and
detecting a second time, at which the hyperlink is selected, and
wherein said judging determines whether a difference between the first time and the second time is equal to or greater than the predetermined time period.

* * * * *

UNITED STATES PATENT AND TRADEMARK OFFICE
CERTIFICATE OF CORRECTION

PATENT NO.         : 8,296,645 B2
APPLICATION NO.    : 12/046826
DATED              : October 23, 2012
INVENTOR(S)        : Hirotaka Shimizu Page 1 of 1

It is certified that error appears in the above-identified patent and that said Letters Patent is hereby corrected as shown below:

Column 14, Line 43, In Claim 6, delete "readable" and insert -- readable recording medium --, therefor.

Signed and Sealed this
First Day of January, 2013

David J. Kappos
*Director of the United States Patent and Trademark Office*